Figure 1:
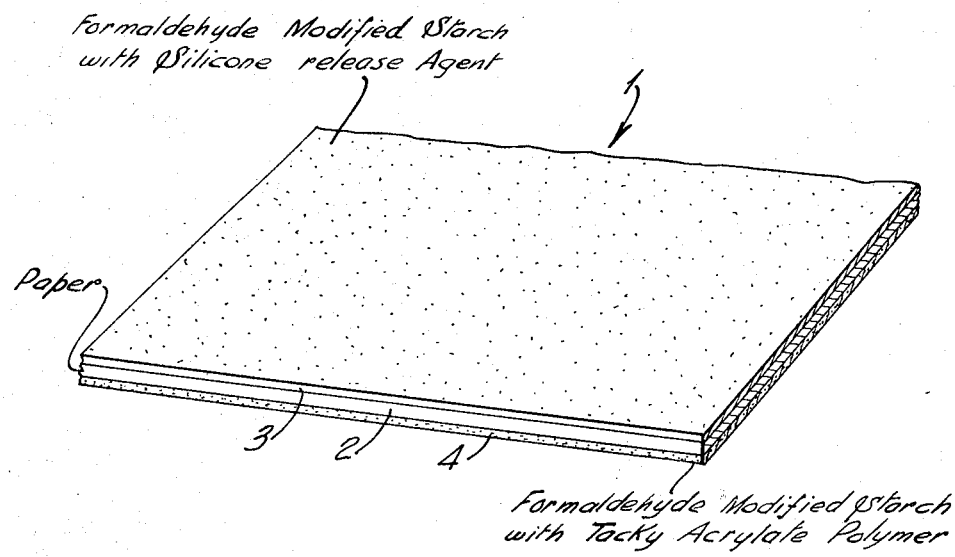

Jan. 24, 1967  B. VASSEL ET AL  3,300,330
CARRIER SHEET CONTAINING ON OPPOSITE SIDES A FORMALDEHYDE
MODIFIED STARCH RELEASE COATING AND A FORMALDEHYDE
MODIFIED STARCH TACKY COATING
Filed Oct. 9, 1962

INVENTORS.
BRUNO VASSEL
VINIBALDA FURTNER
HANS ISRAEL FEIGE
BY Nicholas A. Galle, III
ATTORNEY United States Patent Office 3,300,330
Patented Jan. 24, 1967

3,300,330
CARRIER SHEET CONTAINING ON OPPOSITE SIDES A FORMALDEHYDE MODIFIED STARCH RELEASE COATING AND A FORMALDEHYDE MODIFIED STARCH TACKY COATING
Bruno Vassel, Vinibalda Furtner, and Hans Israel Feige, Sao Paulo, Brazil, assignors to Johnson & Johnson, a corporation of New Jersey
Filed Oct. 9, 1962, Ser. No. 229,474
2 Claims. (Cl. 117—68.5)

The present invention is drawn to the coating of sheet material and more particularly to the coating of sheet material with starch compositions in the formation of pressure-sensitive adhesive tapes and carrier papers used in making the same and the tapes and carrier papers so made.

In making water repellent tapes, the fabric backing has been coated with nitrocellulose, cellulose acetate, polyvinyl chloride, or other substantially impervious film forming material. Such coating materials have the disadvantage that they are spread from organic solvent systems which are relatively expensive requiring recovery of the solvents used. Besides this disadvantage of relatively high cost, the coating forms a complete barrier to water vapor transmission. As a result, even though the adhesive may be spread in an open pattern, or may itself be porous, water vapor nevertheless cannot pass through the tape to permit water vapor transfer from the skin to the air.

It has now been discovered that if formaldehyde modified starch is used as the primary coating composition that the coating can be spread from a water system and that the resulting coating is also air pervious.

In practicing the present invention, the formaldehyde modified starch is first prepared by making a starch in water suspension, adding formaldehyde to the suspension and heating gently with stirring to form a gel, cooling the gel back to room temperature, and then homogenizing the gel. The homogenized gel is then mixed with a plasticizer and other materials depending on the particular coating desired.

The starch may be any of the common varieties of natural starch, such, for example, as corn starch, wheat starch, potato starch, rice starch, etc.

The following example illustrates the making of a pressure-sensitive adhesive tape in accordance with the present invention.

In making the formaldehyde-starch gel, a suspension of starch is first formed of about 10 to 40 grams starch in 100 cc. of water. Formaldehyde is then added, preferably as a solution of about 40% formaldehyde, and the pH adjusted to between about 6.8 and 8.0. While gently stirring, the solution is heated to between 60–80° C. for about 10 to 30 minutes until a gel has formed. The gel that forms is brought back to room temperature with constant stirring and, as in the case of surgical tapes where a pigment may be desired, about 25 grams of lithopone, titanium dioxide, or other desired organic coloring matter is added.

This heavy gel is then passed through a homogenizer such, for example, as one of the colloid mill type. An impermeabilizing agent is then added. This is preferably one of the commercially available resinous acid metal salt emulsions, such, for example, as the aluminum and zirconium stearates. IMPERMEAVEL AP is, for example, a commercial emulsion impermeabilizing agent of this type. About 50 grams of an aqueous acrylate emulsion, csuh, for example, as those known in the industry as Polyco 1017–40 or Primal H–8, is also added together with about 1–12 grams of a plasticizer such as dibutyl phthalate or its equivalent. The quantity and type of plasticizer will depend on the softness of the final product which is desired.

This well homogenized emulsion is spread in a conventional manner either by reverse roll or, preferably, by knife on the customary cloth backing for surgical adhesive tapes which may vary in thread count from 70 x 70 to 80 x 80. The preferred solid pick-up on the cloth is about 20 grs./sq. m. The velocity of spreading naturally depends upon the efficiency of drying of the particular oven available. It is generally preferred to spread at speeds of from 5 to 20 meters per minute. For elegant appearance and for the purpose of obtaining a smoother touch, the water repellent cloth is heat calendered in the usual manner.

A pressure-sensitive adhesive, such, for example, as a rubber base pressure-sensitive adhesive, is then coated on the other side of the fabric in the conventional manner of coating such adhesives. The adhesive is preferably coated in an open pattern to take advantage of the air pervious nature of the backing.

One particular interesting feature of this waterproofing method is that when the finished surgical tape is rolled up in the customary 2 to 5 meter lengths, the unwind tension is so low that it seems that a special release agent had been incorporated which, however, was not done, the formula itself providing this desirable effect.

The formaldehyde-modified starch coating compositions, in accordance with the present invention, are also used in the preparation of reinforcing papers of the type used for supporting film-backed pressure-sensitive adhesive sheet materials and tapes.

Figure 2:
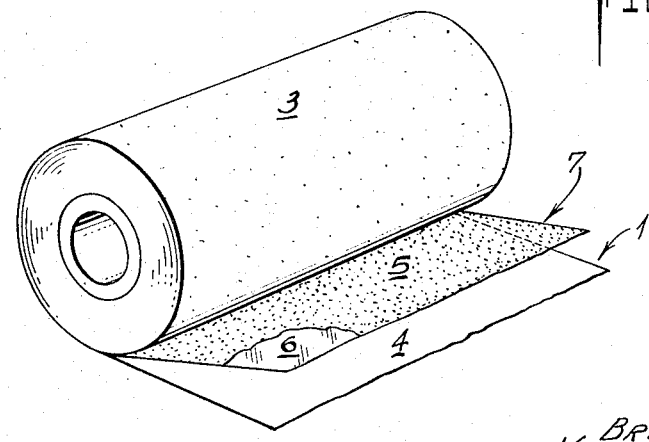

The construction and use of these reinforcing papers will be better understood by reference to the drawings. In the drawings, FIG. 1 is a cross-sectional view in perspective of a reinforcing paper containing formaldehyde modified starch coating compositions;

FIG. 2 is a view in perspective of the reinforcing paper of FIG. 1 wound on itself in roll form with a pressure-sensitive adhesive tape.

Referring specifically to the drawings:

In the manufacture and handling of such tapes 7, the film backing 6 is cast on a carrier paper 1 and then coated with a pressure-sensitive adhesive 5. The carrier paper serves to support the film 6 during the coating and forming process and in later handling, such as severing into rolls of the desired width. With papers of this type, it is desired that the side 4 contacting the film 6 backing bond slightly to the film 6 while the other side 3 which contacts the adhesive 5 when the composite is rolled on itself must be readily releasable from the adhesive surface 5.

In the case of reinforcing or carrier papers, the pigments are left out from the starch-formaldehyde reaction product. This reaction product is put through a colloid mill, in the manner described previously, and to about 90 grams of a 15% solids solution are added 0.5 gram of citric acid, 4 grams of a plasticizer or starch softener such as tallow, 5.5 grams of a 40% DC-22 silicon emulsion, and 1.1 grams of the corresponding DC-22 catalyst emulsion. The side 3 of the paper 2 receiving this formula is the one which eventually will come in contact with the adhesive mass 5 of the plastic film 6 onto which it was spread. The other side 4 of the paper, to which the plastic 6 is lightly glued, does not contain the silicone nor the catalyzer but, instead, a slightly tacky substance such as an acrylate emulsion.

Having thus described our invention, we claim:

1. A carrier sheet for use in the manufacture of film back pressure-sensitive adhesive sheets and adapted to be rolled up as an interliner for the same, comprising a fibrous substrate containing on one side thereof a plasticized coating adapted to release readily from pressure-sensitive adhesives and consisting essentially of a formaldehyde modified starch and a silicone emulsion release agent and containing on the opposite side thereof a plasticized coating adapted to adhere to film backings and consisting essentially of a formaldehyde modified starch and a substance which is tacky with respect to said films.

2. A carrier sheet of claim 1 in which said tacky substance is an acrylate polymer.

References Cited by the Examiner

UNITED STATES PATENTS

| 2,188,331 | 1/1940 | Coggeshall | 117—86 X |
| 2,212,314 | 8/1940 | Bauer et al. | 260—9 |
| 2,346,624 | 4/1944 | Straus | 117—64 |
| 2,484,416 | 10/1949 | Martin | 117—68.5 |
| 2,603,576 | 7/1952 | Cook et al. | 117—86 X |
| 2,756,164 | 7/1956 | Fisher | 117—64 |
| 2,803,613 | 8/1957 | Kather et al. | 260—29.2 |
| 2,971,863 | 2/1961 | Kindseth et al. | 117—68.5 |
| 3,222,199 | 12/1965 | Hickey | 106—213 |

FOREIGN PATENTS 772,479   4/1957   Great Britain.

MURRAY KATZ, *Primary Examiner.*

W. D. HERRICK, *Assistant Examiner.*